United States Patent
Oishi et al.

(10) Patent No.: US 8,110,646 B2
(45) Date of Patent: Feb. 7, 2012

(54) PREPARATION OF TRIORGANOSILOXY END-CAPPED ORGANOPOLYSILOXANE

(75) Inventors: Kazuhiro Oishi, Annaka (JP); Toshio Yamazaki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 13 days.

(21) Appl. No.: 12/851,898

(22) Filed: Aug. 6, 2010

(65) Prior Publication Data

US 2011/0040063 A1 Feb. 17, 2011

(30) Foreign Application Priority Data

Aug. 14, 2009 (JP) ................................. 2009-187926

(51) Int. Cl.
*C08G 77/08* (2006.01)
(52) U.S. Cl. ........................................... 528/14; 528/15
(58) Field of Classification Search .................... 528/14, 528/15
See application file for complete search history.

(56) References Cited

U.S. PATENT DOCUMENTS

| | | | | |
|---|---|---|---|---|
| 3,974,120 A | * | 8/1976 | Razzano et al. | 528/140 |
| 4,028,338 A | * | 6/1977 | Razzano | 528/37 |
| 4,317,899 A | * | 3/1982 | Bluestein et al. | 528/14 |
| 4,683,277 A | * | 7/1987 | Maxson | 528/21 |
| 4,988,758 A | * | 1/1991 | Fukuda et al. | 524/492 |
| 5,028,679 A | * | 7/1991 | Terae et al. | 528/12 |
| 5,064,889 A | * | 11/1991 | Ikeno | 524/188 |
| 5,140,087 A | * | 8/1992 | Saho et al. | 528/14 |
| 5,236,997 A | * | 8/1993 | Fujiki | 524/731 |
| 5,300,609 A | * | 4/1994 | Kobayashi | 528/14 |
| 5,420,189 A | * | 5/1995 | Kishita et al. | 524/731 |
| 5,696,219 A | * | 12/1997 | Jallouli et al. | 528/21 |
| 5,824,736 A | * | 10/1998 | Kobayashi et al. | 524/588 |
| 5,858,599 A | * | 1/1999 | Yamaguchi et al. | 430/124.34 |
| 6,232,425 B1 | | 5/2001 | Razzano et al. | |
| 6,337,086 B1 | * | 1/2002 | Kanios et al. | 424/449 |
| 6,492,479 B2 | | 12/2002 | Razzano et al. | |
| 2006/0293479 A1 | * | 12/2006 | Razzano | 528/28 |
| 2008/0090985 A1 | | 4/2008 | Gosh et al. | |
| 2008/0090987 A1 | * | 4/2008 | Gosh et al. | 528/30 |

* cited by examiner

*Primary Examiner* — Robert Loewe
(74) *Attorney, Agent, or Firm* — Oblon, Spivak, McClelland, Maier & Neustadt, L.L.P.

(57) ABSTRACT

A triorganosiloxy end-capped organopolysiloxane, i.e., organopolysiloxane having a backbone consisting essentially of repeating (3,3,3-trifluoropropyl)methylsiloxane units and end-capped with triorganosiloxy groups is prepared by copolymerizing tris(3,3,3-trifluoropropyl)trimethylcyclo-trisiloxane with a silanol end-capped organopolysiloxane in the presence of an alkyllithium or lithium silanolate catalyst to form a silanol end-capped copolymer, and adding a trialkylsilyl triflate or strong acid in excess relative to the catalyst and a hexaorganodisilazane for effecting end-capping and neutralization.

8 Claims, No Drawings

PREPARATION OF TRIORGANOSILOXY END-CAPPED ORGANOPOLYSILOXANE

CROSS-REFERENCE TO RELATED APPLICATION

This non-provisional application claims priority under 35 U.S.C. §119(a) on Patent Application No. 2009-187926 filed in Japan on Aug. 14, 2009, the entire contents of which are hereby incorporated by reference.

TECHNICAL FIELD

This invention relates to a process for preparing a triorganosiloxy end-capped organopolysiloxane having a backbone consisting essentially of repeating (3,3,3-trifluoropropyl)methylsiloxane units and end-capped with triorganosiloxy groups.

BACKGROUND ART

Fluorosilicone polymers are used in a wide variety of applications including precision machine lubricants, working fluids, defoamers, parting agents, fluororubber plasticizers, and liquid fluorosilicone rubber bases.

Recently, liquid fluorosilicone rubber using organosilyl end-capped diorganopolysiloxane was developed. The liquid fluorosilicone rubber has fuel resistance, oil resistance, solvent resistance and chemical resistance equivalent to those of the millable silicone rubber and is applicable to high-precision small-size molding and thin-film coating which are difficult with the millable type. The liquid fluorosilicone rubber is thus expected to find application as parts in transport vehicles (e.g., automobiles and aircraft) and oil-related equipment.

In the prior art, organosiloxy end-capped diorganopolysiloxanes are produced in various ways. US 20080090985 discloses a process including ring-opening polymerization of tris(3,3,3-trifluoropropyl)trimethylcyclo-trisiloxane using triorganosilanol as an end-stopping compound and a siloxane oligomer of an organosodium compound as a polymerization catalyst, and end-capping with hexaorganodisilazane. U.S. Pat. No. 6,492,479 discloses end-capping through reaction of hexaorganodisiloxane in the presence of a linear phosphonitrilic chloride. These processes have the following problems.

(1) Since an organosodium compound is used as the catalyst, condensation reaction of silanol groups at ends of polysiloxane occurs during ring-opening polymerization of tris(3,3,3-trifluoropropyl)trimethylcyclotrisiloxane. It is then difficult to control the molecular weight and viscosity.

(2) Since triogranosilanol as the end-stopping compound is unstable and susceptible to dehydration condensation at elevated temperature, it may become hexaorganodisiloxane, reducing the purity of end groups. The water of condensation becomes a new end-stopping compound to complicate the end control.

(3) Since the terminal silanol having a trifluoropropyl group has a low activity, the use of hexaorganodisilazane alone is not regarded to ensure that the product is completely end-capped with organosilyl groups.

(4) When hexaorganodisiloxane is reacted in the presence of a linear phosphonitrilic chloride having high catalytic activity, the terminal silanol is fully capped with an organosilyl group. However, if decomposition residues of linear phosphonitrilic chloride including nitrides and phosphorus compounds are left, they become vulcanization inhibitors when used in liquid silicone rubber. It is difficult to remove in vacuum the decomposition residues of linear phosphonitrilic chloride from high degree-of-polymerization (or high viscosity) oils. Removal requires a special equipment or washing by solvent dilution. Although U.S. Pat. No. 6,232,425 discloses a process for the synthesis of end-stopped diorganosiloxane fluid using tris(3,3,3-trifluoropropyl)trimethylcyclotrisiloxane and a hexaorganodisiloxane as the end-stopping compound in the presence of linear phosphonitrilic chloride as the catalyst, this process has the same drawbacks. There exists a need to manufacture high degree-of-polymerization (or high viscosity) organosilyl end-capped fluorosilicone polymers having a controlled viscosity and chain length and featuring a high precision of end-stopping.

Citation List
Patent Document 1: US 20080090985
Patent Document 2: U.S. Pat. No. 6,492,479
Patent Document 3: U.S. Pat. No. 6,232,425

SUMMARY OF INVENTION

An object of the invention is to provide a process for preparing a triorganosiloxy end-capped organopolysiloxane having a backbone consisting essentially of repeating (3,3,3-trifluoropropyl)methylsiloxane units and end-capped with triorganosiloxy groups, which process is easy to control molecular weight (or degree of polymerization) and viscosity so that the organopolysiloxane having the desired molecular weight (or degree of polymerization) and viscosity may be produced in a consistent manner.

The inventors have found that a fluorosilicone polymer having a controlled chain length (or degree of polymerization) and improved vulcanization properties as compared with fluorosilicone polymers produced by the prior art processes can be produced by copolymerizing a chemically stable silanol end-capped organopolysiloxane and tris(3,3,3-trifluoropropyl)trimethylcyclotrisiloxane in the presence of an alkyllithium catalyst or lithium silanolate catalyst, which can avoid non-specific condensation reaction during ring-opening polymerization, in a living polymerization mode to form a copolymer capped with a silanol group (or lithium salt thereof) at an end of its molecular chain; and adding a mixed solution of a trialkylsilyl triflate or strong acid in excess relative to the catalyst and a hexaorganodisilazane to the reaction product for thereby achieving end-capping and neutralization at the same time, or adding a trialkylsilyl triflate or strong acid in excess relative to the catalyst to the reaction product for thereby effecting neutralization and then adding a hexaorganodisilazane to the reaction product for thereby capping the terminal silanol group (or its lithium salt) with a triorganosiloxy group.

In one aspect, the invention provides a process for preparing a triorganosiloxy end-capped organopolysiloxane, comprising the steps of:

copolymerizing tris(3,3,3-trifluoropropyl)trimethyl-cyclotrisiloxane which is a cyclic trimer of the formula (1):

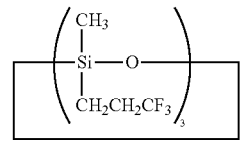

(1)

with an organosilane or organopolysiloxane of the general formula (2):

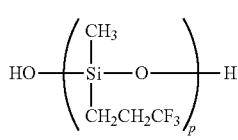

(2)

wherein p is an integer of 1 to 100, in the presence of an alkyllithium catalyst or lithium silanolate catalyst to form a copolymer capped with a silanol group at an end of its molecular chain, adding a mixed solution of a trialkylsilyl triflate in excess relative to said catalyst and a hexaorganodisilazane or a mixed solution of a strong acid in excess relative to said catalyst and a hexaorganodisilazane to the reaction product for thereby capping the silanol group at the molecular chain end with a triorganosiloxy group and simultaneously effecting neutralization by deactivation of said catalyst, and heating the reaction product in vacuum to remove any vulcanization inhibitors, thus recovering an organopolysiloxane having the general formula (3):

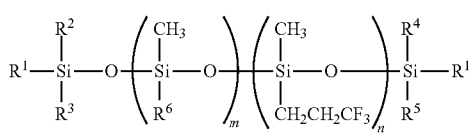

(3)

wherein $R^1$ is a substituted or unsubstituted monovalent hydrocarbon group of 1 to 8 carbon atoms, each of $R^2$ to $R^6$ is a substituted or unsubstituted, aliphatic unsaturation-free, monovalent hydrocarbon group of 1 to 8 carbon atoms, m is an integer of 0 to 100, and n is an integer of 1 to 1,000.

In another aspect, the invention provides a process for preparing a triorganosiloxy end-capped organopolysiloxane, comprising the steps of:

copolymerizing tris(3,3,3-trifluoropropyl)trimethyl-cyclotrisiloxane which is a cyclic trimer of formula (1) with an organosilane or organopolysiloxane of formula (2) in the presence of an alkyllithium catalyst or lithium silanolate catalyst to form a copolymer capped with a silanol group at an end of its molecular chain, adding a trialkylsilyl triflate or strong acid in excess relative to said catalyst to the reaction product for effecting neutralization by deactivation of said catalyst, then adding a hexaorganodisilazane to the reaction product for capping the silanol group at the molecular chain end with a triorganosiloxy group, and heating the reaction product in vacuum to remove any vulcanization inhibitors, thus recovering an organopolysiloxane having formula (3).

In one preferred embodiment, the alkyllithium catalyst or lithium silanolate catalyst is a lithium silanolate catalyst of the general formula (5):

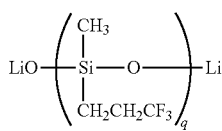

(5)

wherein q is an integer of 1 to 100, and/or a siloxane oligomer of an organolithium compound of the general formula (6):

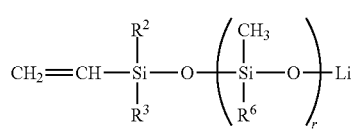

(6)

wherein each of $R^2$, $R^3$ and $R^6$ is a substituted or unsubstituted, aliphatic unsaturation-free, monovalent hydrocarbon group of 1 to 8 carbon atoms, and r is an integer of 1 to 100.

In a preferred embodiment, the hexaorganodisilazane is hexamethyldisilazane, 1,3-divinyltetramethyldisilazane or both.

In a preferred embodiment, the trialkylsilyl triflate is trimethylsilyl triflate, dimethylvinylsilyl triflate or both.

In a preferred embodiment, the strong acid is at least one member selected from the group consisting of trifluoromethanesulfonic acid, methanesulfonic acid, conc. sulfuric acid, p-toluenesulfonic acid, hydrochloric acid, aluminum chloride, and boron trifluoride-diethyl ether complex.

In a preferred embodiment, the trialkylsilyl triflate is dimethylvinylsilyl triflate, the hexaorganodisilazane is 1,3-divinyltetramethyldisilazane, and the organopolysiloxane of formula (3) has the general formula (4):

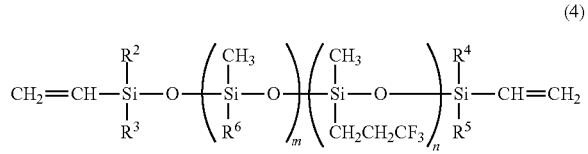

(4)

wherein each of $R^2$ to $R^6$ is a substituted or unsubstituted, aliphatic unsaturation-free, monovalent hydrocarbon group of 1 to 8 carbon atoms, m is an integer of 0 to 100, and n is an integer of 1 to 1,000.

The step of heating the reaction product in vacuum to remove any vulcanization inhibitors is typically at a temperature of at least 150° C.

ADVANTAGEOUS EFFECTS OF INVENTION

The process of the invention is effective for yielding a triorganosiloxy end-capped organopolysiloxane, i.e., organopolysiloxane whose backbone consists essentially of repeating (3,3,3-trifluoropropyl)methylsiloxane units and which is capped at both ends of its molecular chain with triorganosiloxy groups. Since a chemically stable silanol end-capped organopolysiloxane as the end-stopping compound and an alkyllithium or lithium silanolate catalyst which can avoid non-specific condensation reaction are used, the process is easy to control molecular weight (or degree of polymerization) and viscosity and ensures consistent polymerization. Since the trialkylsilyl triflate or strong acid acts as a catalyst for the hexaorganodisilazane, the silanol group (or its lithium salt) at the molecular chain end can be capped with a triorganosiloxy group in an efficient and consistent manner. The alkyllithium or lithium silanolate catalyst can be deactivated at the same time. Since the reaction residues are minimized, any vulcanization inhibitors can be readily removed by vacuum heating. A triorganosiloxy end-capped organopolysiloxane having improved vulcanization properties can be produced in a consistent manner.

As used herein, for example, the term "triorganosiloxy end-capped organopolysiloxane" refers to an organopolysiloxane which is capped at both ends of its molecular chain with triorganosiloxy groups, unless otherwise stated.

DESCRIPTION OF EMBODIMENTS

The organopolysiloxane obtained from the inventive process is a triorganosiloxy end-capped organopolysiloxane having the general formula (3):

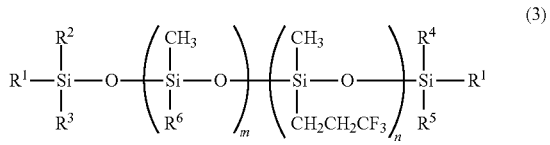

(3)

wherein $R^1$ is a substituted or unsubstituted monovalent hydrocarbon group of 1 to 8 carbon atoms, each of $R^2$ to $R^6$ is a substituted or unsubstituted, aliphatic unsaturation-free, monovalent hydrocarbon group of 1 to 8 carbon atoms, m is an to integer of 0 to 100, and n is an integer of 1 to 1,000.

Specifically, $R^1$ is selected from optionally substituted monovalent hydrocarbon groups of 1 to 8 carbon atoms, examples of which include alkyl groups such as methyl, ethyl, propyl, isopropyl and butyl, alkenyl groups such as vinyl and allyl, aryl groups such as phenyl and tolyl, and substituted forms of the foregoing in which some or all carbon-bonded hydrogen atoms are replaced by halogen atoms, cyano groups or the like, such as chloromethyl, chloropropyl, 3,3,3-trifluoropropyl and 2-cyanoethyl. $R^1$ is preferably an aliphatic unsaturated group of 1 to 6 carbon atoms, with vinyl being most preferred.

$R^2$ to $R^6$ are each independently selected from optionally substituted, aliphatic unsaturation-free, monovalent hydrocarbon groups of 1 to 8 carbon atoms, preferably 1 to 6 carbon atoms, examples of which include alkyl groups such as methyl, ethyl, propyl, isopropyl and butyl, aryl groups such as phenyl and tolyl, and substituted forms of the foregoing in which some or all carbon-bonded hydrogen atoms are replaced by halogen atoms, cyano groups or the like, such as chloromethyl, chloropropyl, 3,3,3-trifluoropropyl and 2-cyanoethyl. $R^2$ to $R^5$ are preferably methyl, and $R^6$ is preferably methyl or 3,3,3-trifluoropropyl.

The subscript m is an integer of 0 to 100, i.e., $0 \leq m \leq 100$, preferably 0 to 50, more preferably 0 to 30, even more preferably 0 to 20, and most preferably 0 to 10; and n is an integer of 1 to 1,000, i.e., $1 \leq n \leq 1{,}000$, preferably 5 to 900, more preferably 10 to 800, even more preferably 50 to 800, and most preferably 100 to 800. The sum of m and n is preferably 5 to 950, i.e., $5 \leq m+n \leq 950$, more preferably 10 to 830, even more preferably 60 to 830, and most preferably 120 to 830.

The organopolysiloxane of formula (3) is prepared by copolymerizing tris(3,3,3-trifluoropropyl)trimethylcyclo-trisiloxane which is a cyclic trimer of the formula (1):

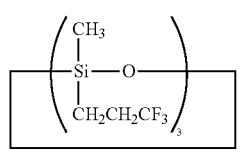

(1)

with an organosilane or organopolysiloxane of the general formula (2):

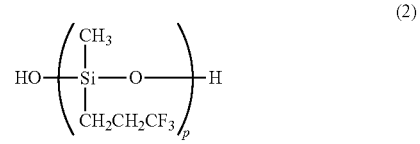

(2)

wherein p is an integer of 1 to 100, in the presence of an alkyllithium catalyst or lithium silanolate catalyst to form a copolymer capped with a silanol group (or a lithium salt thereof) at an end of its molecular chain. Namely living polymerization is carried out to extend the chain length of a fluoroalkylmethylpolysiloxane.

In formula (2), p is an integer of 1 to 100, i.e., $0 < p \leq 100$, preferably 1 to 50, and more preferably 2 to 20.

In the polymerization step, the cyclic trimer of formula (1), tris(3,3,3-trifluoropropyl)trimethylcyclo-trisiloxane and the organosilane or organopolysiloxane of formula (2) are typically used in such amounts that 0.0001 to 1 mole, preferably 0.005 to 1 mole of the organosilane or organopolysiloxane of formula (2) is present per mole of tris(3,3,3-trifluoropropyl) trimethylcyclotrisiloxane of formula (1).

The alkyllithium catalyst or lithium silanolate catalyst used herein is preferably a difunctional lithium silanolate catalyst having a backbone (or molecular chain) consisting of repeating diorganosiloxane units and capped at both ends of the molecular chain with lithium ions, represented by the general formula (5):

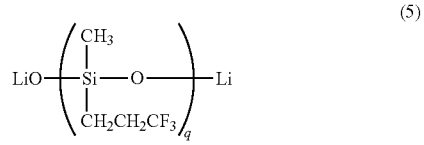

(5)

wherein q is an integer of 1 to 100, or a siloxane oligomer of an organolithium compound such as diorganovinyl siloxy lithium (i.e., monofunctional lithium silanolate catalyst capped at one end of molecular chain with a lithium ion), represented by the general formula (6):

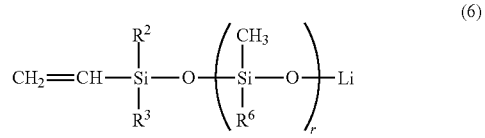

(6)

wherein $R^2$, $R^3$ and $R^6$ are each independently a substituted or unsubstituted, aliphatic unsaturation-free, monovalent hydrocarbon group of 1 to 8 carbon atoms, and r is an integer of 1 to 100.

In formula (5), q is an integer of 1 to 100, i.e., $0 < q \leq 100$, preferably 2 to 50, and more preferably 2 to 20.

In formula (6), $R^2$, $R^3$ and $R^6$ are each independently selected from optionally substituted, aliphatic unsaturation-free, monovalent hydrocarbon groups of 1 to 8 carbon atoms, preferably 1 to 6 carbon atoms, examples of which include alkyl groups such as methyl, ethyl, propyl, isopropyl and butyl, aryl groups such as phenyl and tolyl, and substituted forms of the foregoing in which some or all carbon-bonded hydrogen atoms are replaced by halogen atoms, cyano groups or the like, such as chloromethyl, chloropropyl, 3,3,3-trifluoropropyl and 2-cyanoethyl. $R^2$ and $R^3$ are preferably methyl, and $R^6$ is preferably methyl or 3,3,3-trifluoropropyl. For the reason that the polymer reduces its fuel resistance, oil resistance, solvent resistance and chemical resistance as the value of r increases, r is an integer of 1 to 100, i.e., $0<r\leq100$, preferably 1 to 50, more preferably 1 to 20, and even more preferably 1 to 10.

The alkyllithium or lithium silanolate catalyst may be used in a catalytic amount which is not particularly limited. The catalyst is typically used in such amounts that 0.0001 to 0.005 mole, preferably 0.0002 to 0.002 mole of the catalyst is present per mole of tris(3,3,3-trifluoropropyl)trimethyl-cyclotrisiloxane.

Suitable living polymerization conditions include a temperature of 100 to 240° C., preferably 120 to 200° C., more preferably 135 to 170° C., and a time of 5 minutes to 24 hours, preferably 10 minutes to 12 hours. Temperatures below 100° C. are undesirable because the progress of polymerization is significantly retarded.

To the silanol (or lithium salt) end-capped fluoroalkylmethylpolysiloxane resulting from living polymerization, a mixed solution of a trialkylsilyl triflate or strong acid in excess relative to the catalyst and a hexaorganodisilazane is added for thereby effecting end capping and neutralization at the same time. Alternatively, a trialkylsilyl triflate or strong acid in excess relative to the catalyst is added to the fluoroalkylmethylpolysiloxane for thereby effecting neutralization and thereafter, a hexaorganodisilazane is added for thereby capping the terminal silanol group (or lithium salt) with a triorganosiloxy group. Owing to the hexaorganodisilazane activated by the trialkylsilyl triflate or strong acid, a triorganosiloxy end-capped organopolysiloxane in which the polysiloxane is efficiently and consistently capped at both ends with triorganosiloxy groups is obtainable.

The trialkylsilyl triflate used herein may be any well-known one. Preferred examples are trimethylsilyl triflate and dimethylvinylsilyl triflate, but not limited thereto. The amount of trialkylsilyl triflate added is not particularly limited as long as it is in excess relative to the alkyllithium or lithium silanolate catalyst. Specifically, the trialkylsilyl triflate is added in an amount of about 1.1 to 50 moles, more preferably about 1.3 to 20 moles per mole of the alkyllithium or lithium silanolate catalyst. Note that the term "triflate" stands for trifluoromethanesulfonic ester.

The strong acid used herein may be any well-known one. Preferred examples include trifluoromethanesulfonic acid, methanesulfonic acid, conc. sulfuric acid, p-toluenesulfonic acid, hydrochloric acid, aluminum chloride, and boron trifluoride-diethyl ether complex. Inter alia, trifluoromethanesulfonic acid is preferred on account of high acidity. It is believed that trifluoromethanesulfonic acid when used as the strong acid activates the hexaorganodisilazane and then forms an active intermediate as typified by a trialkylsilyl triflate, which serves as a silylating agent. The use of trifluoromethanesulfonic acid is also preferred on account of the reactivity of triflate as a leaving group. The amount of strong acid added is not particularly limited as long as it is in excess relative to the alkyllithium or lithium silanolate catalyst. Specifically, the strong acid is added in an amount of about 1.1 to 50 moles, more preferably about 1.3 to 20 moles per mole of the alkyllithium or lithium silanolate catalyst.

Examples of the hexaorganodisilazane include hexamethyldisilazane, 1,3-divinyltetramethyldisilazane, 1,3-dimethyltetravinyldisilazane, and hexavinyldisilazane. Inter alia, hexamethyldisilazane and 1,3-divinyltetramethyl-disilazane are preferred. The hexaorganodisilazane may be used in an amount of about 1 to 50 moles, preferably about 1 to 20 moles per mole of silanol groups (i.e., silicon-bonded hydroxyl groups) at molecular chain ends of the fluoroalkylmethylpolysiloxane polymer.

Independent of whether the simultaneous neutralization/end-capping step or successive neutralization and end-capping steps are employed, suitable reaction conditions under which neutralization and end-capping are effected include room temperature (25° C.±10° C.) or an elevated temperature of 60 to 150° C., preferably 80 to 120° C. and a time of 10 minutes to 24 hours, preferably 30 minutes to 12 hours, more preferably 1 to 6 hours. During the reaction under such conditions, the alkyllithium or lithium silanolate catalyst is inactivated, and the hexaorganodisilazane is activated, whereby a triorganosiloxy end-capped organopolysiloxane, i.e., polysiloxane whose terminal silanol group (or lithium salt thereof) is capped with a triorganosiloxy group is obtainable.

The neutralization and end-capping of the polysiloxane is followed by vacuum heating to remove any vulcanization inhibitors, i.e., byproducts of neutralization such as ammonium salts.

In general, the triorganosiloxy end-capped organopolysiloxane product desirably contains less than 1% by weight of volatiles. Volatiles may be removed by stripping at high temperature in vacuum. Although the high-temperature vacuum stripping is not particularly limited, stripping may be achieved by placing the triorganosiloxy end-capped organopolysiloxane product in vacuum and heating at a temperature of 150° C. or higher. Alternatively, stripping may be achieved by nitrogen purging under vacuum and elevated temperature conditions or by any equivalent means. Preferred stripping conditions include a temperature of 150 to 200° C., more preferably 160 to 200° C., and a reduced pressure of up to 500 mmHg (i.e., 0 to 500 mmHg), more preferably up to 300 mmHg (i.e., 0 to 300 mmHg).

In one preferred embodiment, the trialkylsilyl triflate is dimethylvinylsilyl triflate, and the hexaorganodisilazane is 1,3-divinyltetramethyldisilazane. The organopolysiloxane of formula (3) obtained therefrom has the general formula (4):

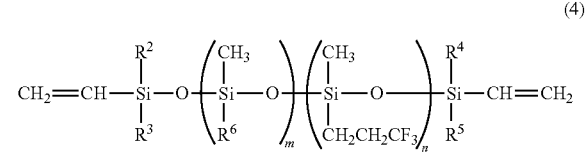

(4)

wherein $R^2$ to $R^6$, m and n are as defined above.

EXAMPLE

Examples of the invention are given below by way of illustration and not by way of limitation.

Example 1

Synthesis of Fluorosilicone Polymer I

A 1-L separable flask was charged with 461.03 g (0.99 mole) of tris(3,3,3-trifluoropropyl)trimethylcyclotrisiloxane and 36.72 g (0.0082 mole) of a silanol end-capped organopolysiloxane of the average molecular formula (7):

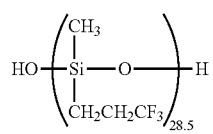
(7)

and heated at 150° C. under a nitrogen gas atmosphere. With stirring, 0.25 g (0.00045 mole) of a siloxane oligomer of an organolithium compound having the formula (8):

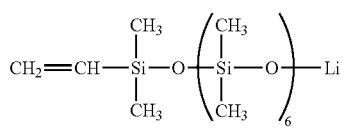
(8)

was added, whereupon polymerization reaction was run at 150° C. for 6 hours to form an organopolysiloxane. After cooling to 100° C., a mixed solution of 0.56 g (0.0024 mole) of dimethylvinylsilyl triflate and 3.41 g (0.018 mole) of 1,3-divinyltetramethyldisilazane was added to the organopolysiloxane. Stirring was continued for 3 hours at 100° C. whereby the siloxane oligomer of an organolithium compound (lithium silanolate catalyst) was neutralized and the siloxane polymer was end-capped with dimethylvinylsiloxy groups at the same time. By vacuum stripping at 155° C. and 400 Pa for 2 hours, a fluorosilicone polymer I, 483.09 g, was obtained. On $^{1}$H and $^{29}$Si-NMR analysis, the product was found to be a mixture of average molecular formulae (9) and (10).

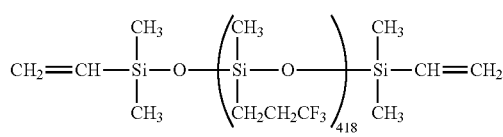
(9)

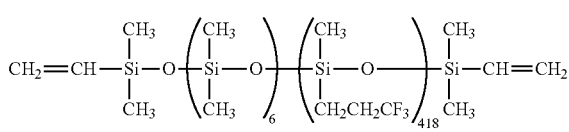
(10)

Example 2

Synthesis of Fluorosilicone Polymer II

A 5-L separable flask was charged with 2811.2 g (6.01 mole) of tris(3,3,3-trifluoropropyl)trimethylcyclotrisiloxane and 223.9 g (0.05 mole) of a silanol end-capped organopolysiloxane of the average molecular formula (7) and heated at 150° C. under a nitrogen gas atmosphere. With stirring, 1.52 g (0.0027 mole) of a siloxane oligomer of an organolithium compound having the formula (8) was added, whereupon polymerization reaction was run at 150° C. for 6 hours to form an organopolysiloxane. After cooling to 100° C., 0.82 g (0.0055 mole) of trifluoromethanesulfonic acid was added to the organopolysiloxane. Stirring was continued for 30 minutes whereby the siloxane oligomer of an organolithium compound was neutralized. Then 20.43 g (0.11 mole) of 1,3-divinyltetramethyldisilazane was added to the organopolysiloxane. Stirring was continued for 3 hours at 100° C. whereby the siloxane polymer was end-capped with dimethylvinylsiloxy groups. By vacuum stripping at 155° C. and 400 Pa for 2 hours, a fluorosilicone polymer II, 2889.46 g, was obtained. On $^{1}$H and $^{29}$Si-NMR analysis, the product was found to be a mixture of average molecular formulae (11) and (12).

(11)

$$CH_2{=}CH{-}\underset{\underset{CH_3}{|}}{\overset{\overset{CH_3}{|}}{Si}}{-}O{-}\left(\underset{\underset{CH_2CH_2CF_3}{|}}{\overset{\overset{CH_3}{|}}{Si}}{-}O\right)_{376}\underset{\underset{CH_3}{|}}{\overset{\overset{CH_3}{|}}{Si}}{-}CH{=}CH_2$$

(12)

$$CH_2{=}CH{-}\underset{\underset{CH_3}{|}}{\overset{\overset{CH_3}{|}}{Si}}{-}O{-}\left(\underset{\underset{CH_3}{|}}{\overset{\overset{CH_3}{|}}{Si}}{-}O\right)_{6}\left(\underset{\underset{CH_2CH_2CF_3}{|}}{\overset{\overset{CH_3}{|}}{Si}}{-}O\right)_{376}\underset{\underset{CH_3}{|}}{\overset{\overset{CH_3}{|}}{Si}}{-}CH{=}CH_2$$

Comparative Example 1

Synthesis of Fluorosilicone Polymer III

A 5-L separable flask was charged with 461.04 g (0.99 mole) of tris(3,3,3-trifluoropropyl)trimethylcyclotrisiloxane and 36.68 g (0.008 mole) of a silanol end-capped organopolysiloxane of the average molecular formula (7) and heated at 150° C. under a nitrogen gas atmosphere. With stirring, 0.24 g (0.00043 mole) of a siloxane oligomer of an organolithium compound having the formula (8) was added, whereupon polymerization reaction was run at 150° C. for 6 hours to form an organopolysiloxane. After cooling to 100° C., 0.06 g (0.001 mole) of acetic acid was added to the organopolysiloxane. Stirring was continued for 30 minutes whereby the siloxane oligomer of an organolithium compound was neutralized. Then 3.48 g (0.019 mole) of 1,3-divinyltetramethyldisilazane was added to the organopolysiloxane. Stirring was continued for 3 hours at 100° C. under an attempt to end-cap the siloxane polymer with a dimethylvinylsiloxy group. By vacuum stripping at 155° C. and 400 Pa for 2 hours, a fluorosilicone polymer III, 490.85 g, was obtained. Since no signals assigned to dimethylvinylsiloxy group at molecular chain end were observed on $^{1}$H and $^{29}$Si-NMR analysis, the product was found to be a silanol end-capped fluorosilicone. Although an average degree of polymerization was not determined because of the absence of dimethylvinylsiloxy groups, the product was presumed to be a mixture of average molecular formulae (13) and (14) on the basis of the molecular weight distribution determined by gel permeation chromatography (GPC) and the charges.

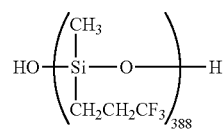
(13)

-continued

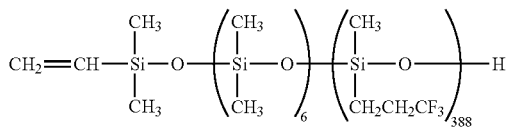
(14)

Japanese Patent Application No. 2009-187926 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A process for preparing a triorganosiloxy end-capped organopolysiloxane, comprising the steps of:

copolymerizing tris(3,3,3-trifluoropropyl)trimethyl-cyclotrisiloxane which is a cyclic trimer of the formula (1):

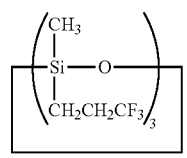
(1)

with an organosilane or organopolysiloxane of the general formula (2):

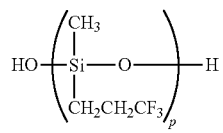
(2)

wherein p is an integer of 4 to 100, in the presence of an alkyllithium catalyst or lithium silanolate catalyst to form a copolymer capped with a silanol group at an end of its molecular chain, adding a mixed solution of a trialkylsilyl triflate in excess relative to said catalyst and a hexaorganodisilazane or a mixed solution of a strong acid in excess relative to said catalyst and a hexaorganodisilazane to the reaction product for thereby capping the silanol group at the molecular chain end with a triorganosiloxy group and simultaneously effecting neutralization by deactivation of said catalyst, and heating the reaction product in vacuum to remove any vulcanization inhibitors, thus recovering an organopolysiloxane having the general formula (3):

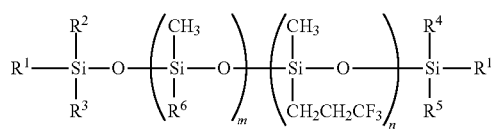
(3)

wherein $R^1$ is a substituted or unsubstituted monovalent hydrocarbon group of 1 to 8 carbon atoms, each of $R^2$ to $R^6$ is a substituted or unsubstituted, aliphatic unsaturation-free, monovalent hydrocarbon group of 1 to 8 carbon atoms, m is an integer of 0 to 100, and n is an integer of 1 to 1,000.

2. The process of claim 1 wherein said alkyllithium catalyst or lithium silanolate catalyst is a lithium silanolate catalyst of the general formula (5):

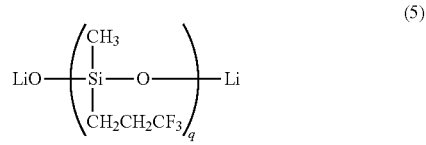
(5)

wherein q is an integer of 1 to 100, and/or a siloxane oligomer of an organolithium compound of the general formula (6):

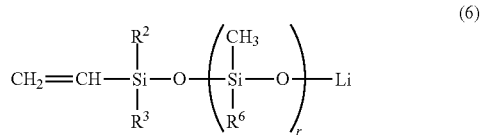
(6)

wherein each of $R^2$, $R^3$ and $R^6$ is a substituted or unsubstituted, aliphatic unsaturation-free, monovalent hydrocarbon group of 1 to 8 carbon atoms, and r is an integer of 1 to 100.

3. The process of claim 1 wherein the hexaorganodisilazane is hexamethyldisilazane, 1,3-divinyltetramethyldisilazane or both.

4. The process of claim 1 wherein the trialkylsilyl triflate is trimethylsilyl triflate, dimethylvinylsilyl triflate or both.

5. The process of claim 1 wherein the strong acid is at least one member selected from the group consisting of trifluoromethanesulfonic acid, methanesulfonic acid, conc. sulfuric acid, p-toluenesulfonic acid, hydrochloric acid, aluminum chloride, and boron trifluoride-diethyl ether complex.

6. The process of claim 1 wherein the trialkylsilyl triflate is dimethylvinylsilyl triflate, the hexaorganodisilazane is 1,3-divinyltetramethyldisilazane, and the organopolysiloxane of formula (3) has the general formula (4):

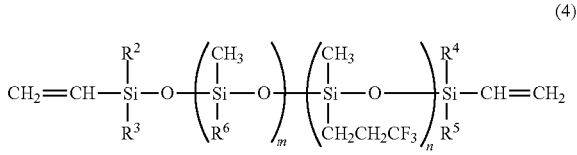
(4)

wherein each of $R^2$ to $R^6$ is a substituted or unsubstituted, aliphatic unsaturation-free, monovalent hydrocarbon group of 1 to 8 carbon atoms, m is an integer of 0 to 100, and n is an integer of 4 to 1,000.

7. The process of claim 1 wherein the step of heating the reaction product in vacuum to remove any vulcanization inhibitors is at a temperature of at least 150° C.

8. A process for preparing a triorganosiloxy end-capped organopolysiloxane, comprising the steps of:

copolymerizing tris(3,3,3-trifluoropropyl)trimethyl-cyclotrisiloxane which is a cyclic trimer of the formula (1):

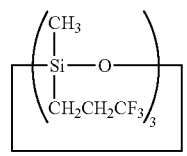

(1)

with an organosilane or organopolysiloxane of the general formula (2):

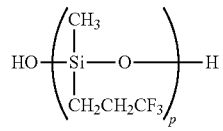

(2)

wherein p is an integer of 4 to 100, in the presence of an alkyllithium catalyst or lithium silanolate catalyst to form a copolymer capped with a silanol group at an end of its molecular chain, adding a trialkylsilyl triflate or strong acid in excess relative to said catalyst to the reaction product for effecting neutralization by deactivation of said catalyst, then adding a hexaorganodisilazane to the reaction product for capping the silanol group at the molecular chain end with a triorganosiloxy group, and heating the reaction product in vacuum to remove any vulcanization inhibitors, thus recovering an organopolysiloxane having the general formula (3):

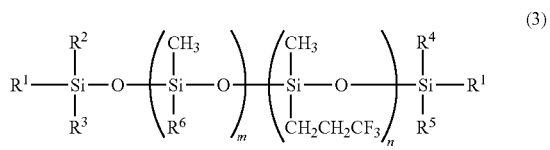

(3)

wherein $R^1$ is a substituted or unsubstituted monovalent hydrocarbon group of 1 to 8 carbon atoms, each of $R^2$ to $R^6$ is a substituted or unsubstituted, aliphatic unsaturation-free, monovalent hydrocarbon group of 1 to 8 carbon atoms, m is an integer of 0 to 100, and n is an integer of 1 to 1,000.

* * * * *